United States Patent
Crisp et al.

(10) Patent No.: US 9,926,936 B2
(45) Date of Patent: Mar. 27, 2018

(54) VARIABLE DISCHARGE COMPRESSOR CONTROL

(71) Applicant: Ford Global Technologies, LLC, Dearborn, MI (US)

(72) Inventors: Nicholas Dashwood Crisp, Leigh-on-Sea (GB); Mike Rowland, Wickham Bishops (GB); Peter Douglas Kuechler, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 584 days.

(21) Appl. No.: 14/286,839

(22) Filed: May 23, 2014

(65) Prior Publication Data

US 2014/0369803 A1    Dec. 18, 2014

(30) Foreign Application Priority Data

Jun. 14, 2013 (GB) .................................. 1310685.1

(51) Int. Cl.
| | |
|---|---|
| *B60H 1/32* | (2006.01) |
| *F04D 27/00* | (2006.01) |
| *F04D 25/02* | (2006.01) |
| *F04D 25/06* | (2006.01) |

(52) U.S. Cl.
CPC ........... *F04D 27/00* (2013.01); *F04D 25/024* (2013.01); *F04D 25/0606* (2013.01); *B60H 2001/3275* (2013.01); *F04B 2201/06* (2013.01); *F04B 2203/0201* (2013.01); *F04B 2203/0401* (2013.01)

(58) Field of Classification Search
CPC .......... F04B 2201/06; F04B 2203/0201; F04B 2203/0401; B60H 2001/3275
USPC .................. 417/12, 26, 27, 222.1, 222.2
See application file for complete search history.

(56) References Cited

U.S. PATENT DOCUMENTS

| | | | |
|---|---|---|---|
| 5,148,685 A | 9/1992 | Takano et al. | |
| 6,675,595 B2 | 1/2004 | Ohya | |
| 7,207,784 B2 * | 4/2007 | Sato ..................... | B60H 1/3222 417/222.1 |
| 8,033,795 B2 | 10/2011 | Dainez et al. | |
| 8,506,261 B2 * | 8/2013 | Taguchi .............. | F04B 27/1804 417/222.1 |
| 2011/0076161 A1 * | 3/2011 | Taguchi .............. | F04B 27/1804 417/213 |

FOREIGN PATENT DOCUMENTS

EP    1075974 A2    2/2001

* cited by examiner

*Primary Examiner* — Peter J Bertheaud
(74) *Attorney, Agent, or Firm* — Greg Brown; McCoy Russell LLP

(57) ABSTRACT

Embodiments are disclosed that relate to controlling a compressor. In one example, method of controlling a compressor comprises regulating a discharge capacity of the compressor via a control current supplied to a control device, holding the control current supplied to the control device at substantially zero amperes for a first duration, and stepping the control current from substantially zero amperes to a sustainable current that provides a sustainable level of a performance parameter of the compressor.

17 Claims, 5 Drawing Sheets

VARIABLE DISCHARGE COMPRESSOR CONTROL

CROSS REFERENCE TO RELATED APPLICATIONS

The present application claims priority to G.B. Patent Application No. 1310685.1, "Variable Discharge Compressor," filed Jun. 14, 2013, the entire contents of which are hereby incorporated by reference for all purposes.

FIELD

The field of the disclosure relates to controlling a compressor of a coolant system in a vehicle.

BACKGROUND AND SUMMARY

During certain operating conditions of a motor vehicle, it may be desirable to temporarily reduce the load on an internal combustion engine powering the vehicle. For example, load reduction may be desired to increase power delivered to a drive train during engine startup, vehicle acceleration, brake vacuum replenishment, and stall mitigation. Various vehicle components may be powered by engine rotation via physical coupling to the engine. As these components require torque to be driven, they impose loads on the engine. Accordingly, reduction of engine load may be achieved by reducing the torque required to drive such components.

One such component that may be coupled to and driven by the engine is a compressor of an air conditioning system configured to enable climate control in a vehicle cabin. The automotive context in which the air conditioning system is placed, however, presents a number of challenges for ensuring desired operation of the air conditioning system. The air conditioning system is configured to generate a required flow of coolant and compress the coolant to increase its temperature so that heat may be exchanged during a condensing cycle; these requirements must be met over a wide range of compressor speeds and are dependent upon ambient conditions. Further, compressor operation is constrained by noise, vibration, and harshness (NVH) and reliability requirements during its service life.

In some approaches, the torque required to drive an air conditioning system compressor is reduced by regulating a current supplied to a control valve of the compressor. Specifically, the current is set to a minimum value (e.g., 0 A) for short periods of time to reduce the amount of circulated coolant in the air conditioning system and regulate the oil return to the compressor.

The inventors herein have recognized several issues with this approach. In particular, the control valve current is pulsed between the minimum valve and a maximum value, which does not reduce the net load on the engine. Moreover, NVH and reliability requirements restrict the control valve current to a limited range (e.g., between 0.25 and 0.85 A). The extent to which the torque delivered to the compressor is this limited by the lower end of this current range.

One approach that at least partially addresses the above issues includes a method of controlling a compressor, comprising regulating a discharge capacity of the compressor via a control current supplied to a control device, holding the control current supplied to the control device at substantially zero amperes for a first duration, and stepping the control current from substantially zero amperes to a sustainable current that provides a sustainable level of a performance parameter of the compressor.

In a more specific example, the method further comprises ramping the control current up to an operational current over a second predetermined duration from the sustainable current.

In another aspect of the example, the performance parameter relates to noise, vibration, and/or reliability of the compressor.

In yet another aspect of the example, the compressor is an externally variable discharge compressor.

In still further another aspect of the example, the control device is a solenoid valve.

In this way, the load imposed on an engine may be reduced by reducing the torque required to drive a compressor coupled to the engine, in turn increasing the power available to a powertrain coupled to the engine. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

As described above, it may be desirable to temporarily reduce the load on an internal combustion engine during certain operation conditions of a motor vehicle. Such conditions include, but are not limited to, engine startup, vehicle acceleration, brake vacuum replenishment, and stall mitigation. As various vehicle components may be driven by the engine via physical coupling thereto, they require torque to be driven, which imposes load on the engine. As such, engine load may be reduced by lowering the torque required to drive these components.

One such component that may be coupled to and driven by the engine is a compressor of an air conditioning system configured to enable climate control in a vehicle cabin. In some approaches, the torque required to drive an air conditioning system compressor is reduced by regulating a current supplied to a control valve of the compressor. Specifically, the current is set to a minimum value (e.g., 0 A) for short periods of time to reduce the amount of circulated coolant in the air conditioning system and regulate the oil return to the compressor. However, the control valve current is pulsed between the minimum valve and a maximum value, which does not reduce the net load on the engine. Moreover, NVH and reliability requirements for the compressor restrict the control valve current to a limited range (e.g., between 0.25 and 0.85 A).

The extent to which the torque delivered to the compressor is this limited by the lower end of this current range.

Figure 1:
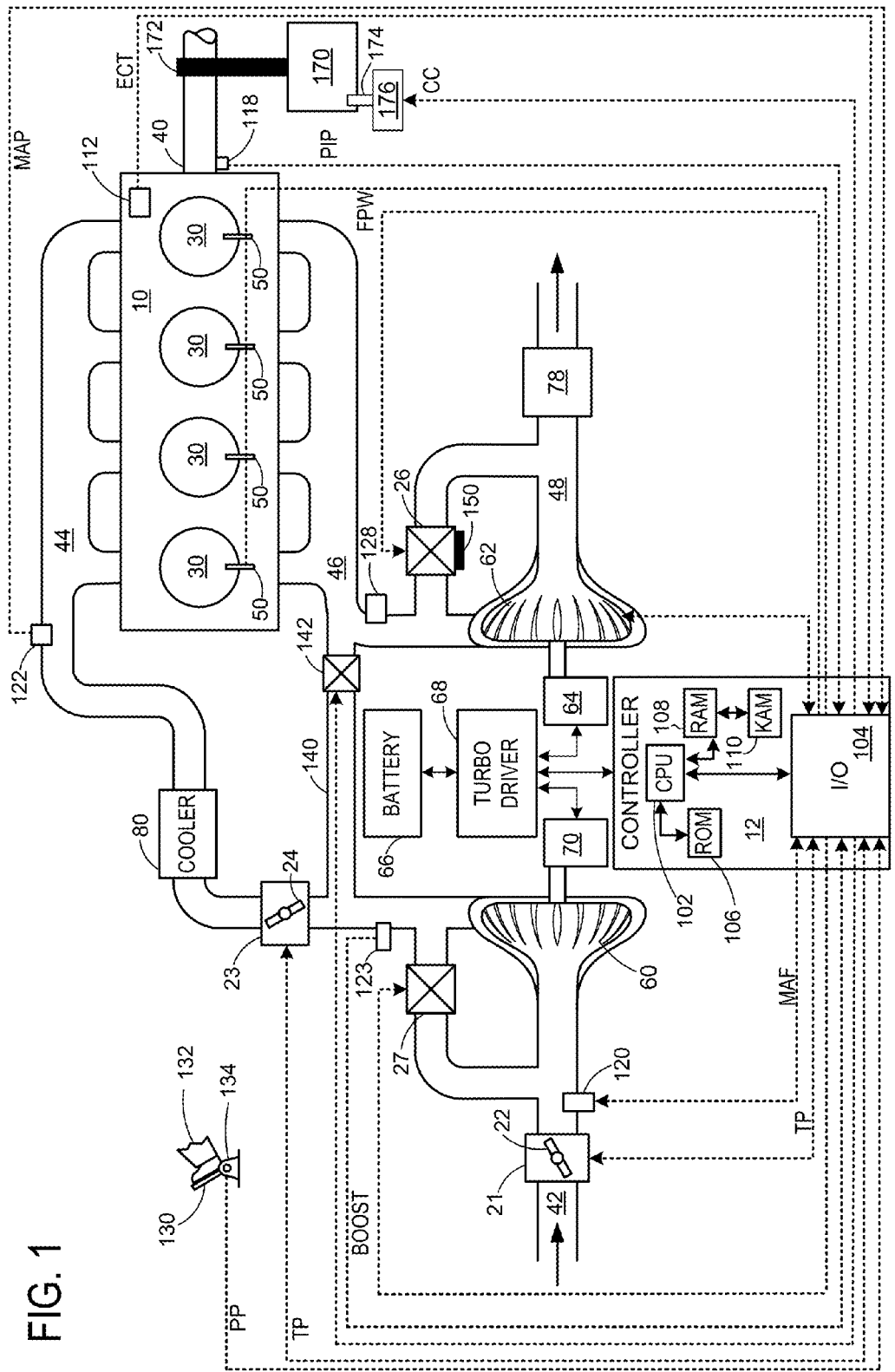
FIG. 1 shows a block diagram of an example engine in accordance with an embodiment of the present disclosure.
Figure 2:
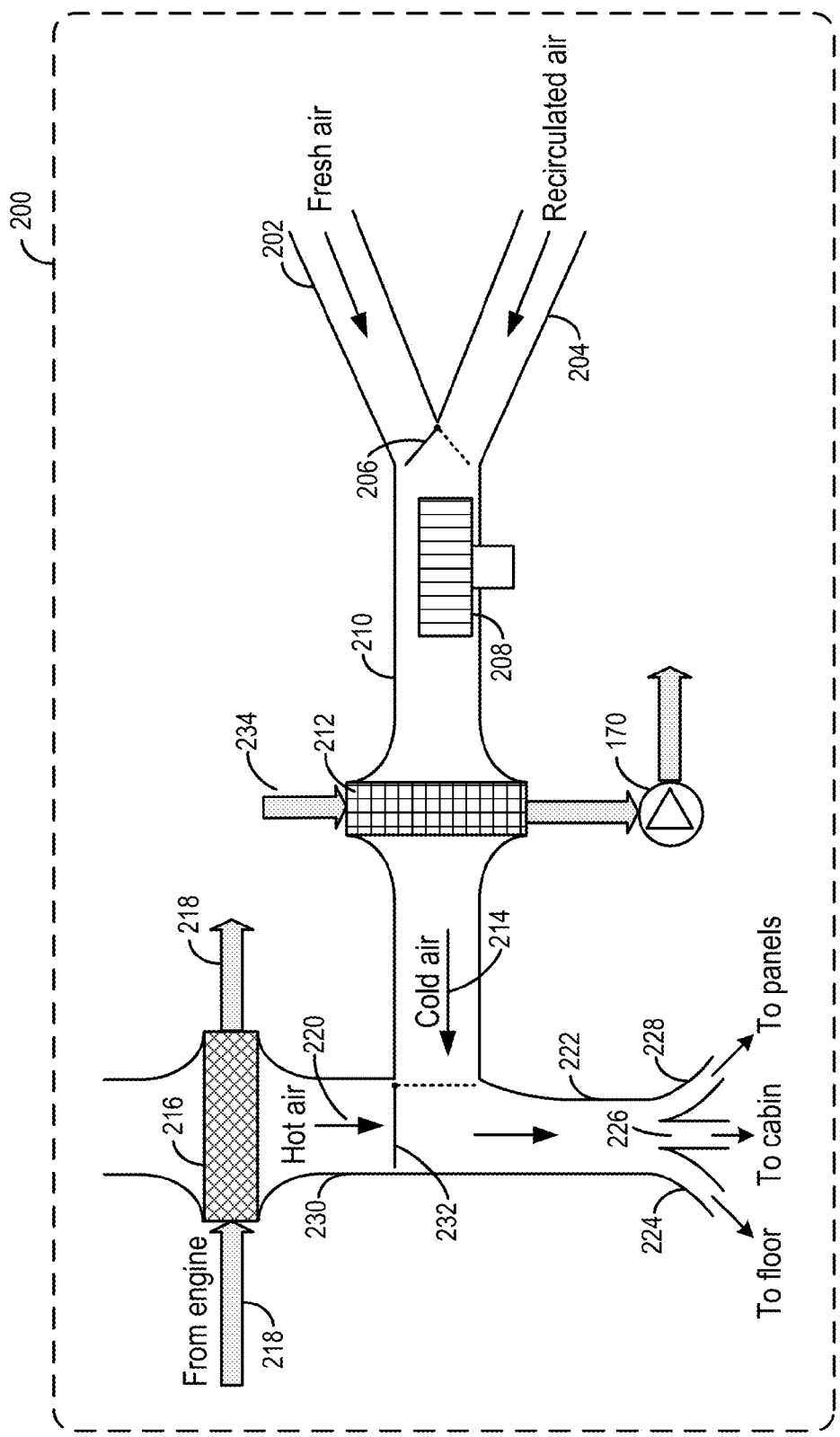
FIG. 2 shows an exemplary HVAC system in accordance with an embodiment of the present disclosure.
Figure 3:
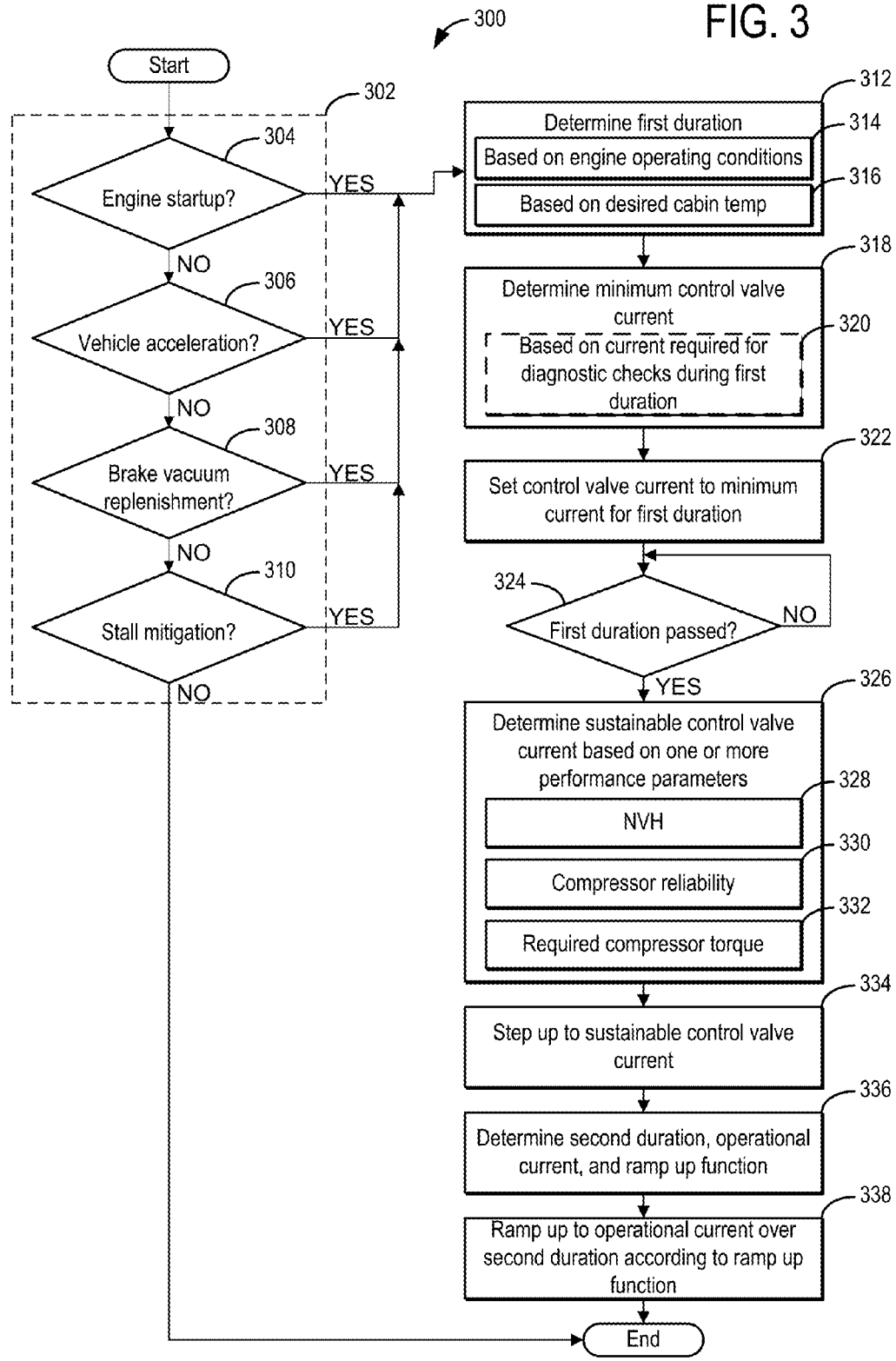
FIG. 3 shows a flowchart illustrating a method of controlling an AC compressor in accordance with an embodiment of the present disclosure.
Figure 4:
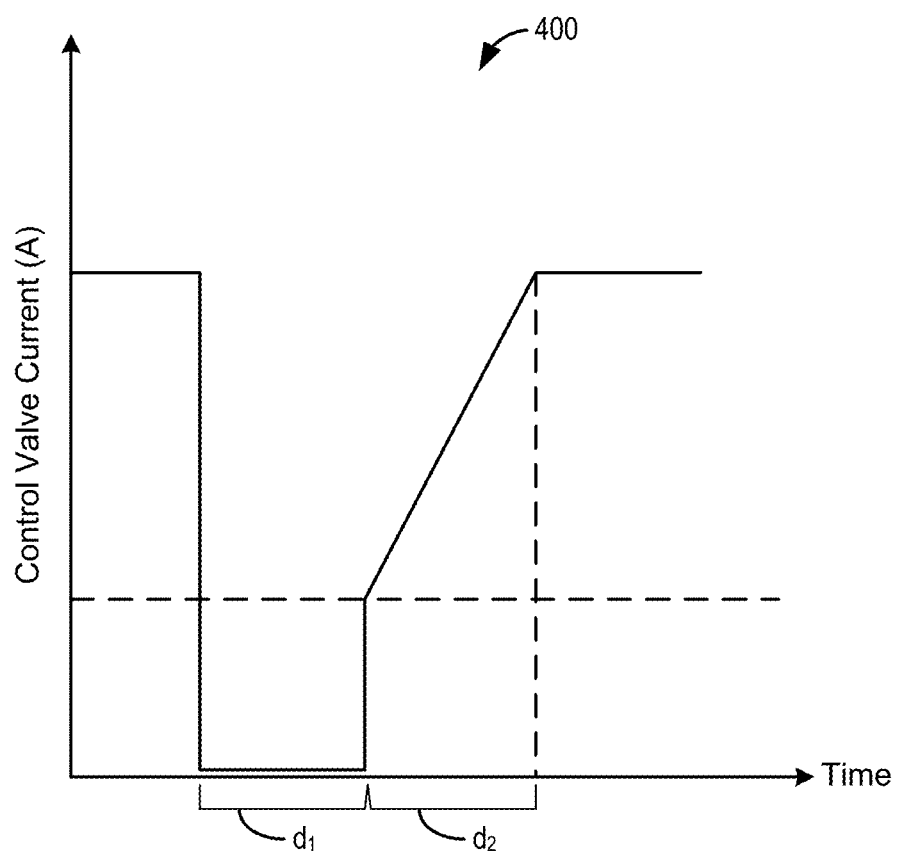
FIG. 4 shows an exemplary graph of compressor operation according to the method of FIG. 3 in accordance with an embodiment of the present disclosure.
Figure 5:
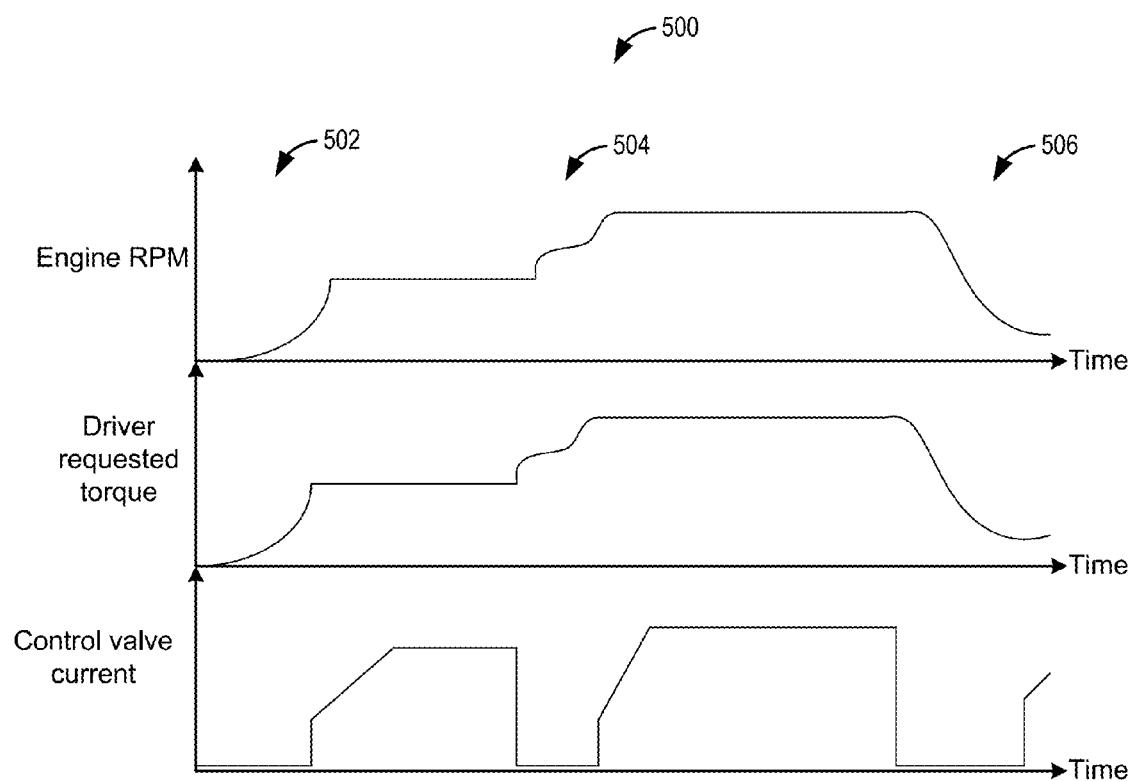
FIG. 5 shows a plot of operating parameters for an exemplary drive cycle of a vehicle.

Various systems and methods for controlling a compressor are thus provided. FIG. 1 shows a block diagram of an example engine; FIG. 2 shows an exemplary HVAC system; FIG. 3 shows a flowchart illustrating a method of controlling an AC compressor; FIG. 4 shows an exemplary graph of compressor operation according to the method of FIG. 3; and FIG. 5 shows a plot of operating parameters for an exemplary drive cycle of a vehicle. The engine of FIG. 1 also includes a controller configured to carry out the method depicted in FIG. 3.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIG. 1 also shows an air conditioning (AC) compressor 170 physically coupled to crankshaft 40 via a belt 172 to enable torque to be transferred from the crankshaft to the compressor, thereby powering the compressor. Additional components not shown may enable this physical coupling, such as a pulley. Further, compressor 170 may optionally include a clutch (not shown). AC compressor 170 forms part of a heating, ventilation, and air conditioning (HVAC) system configured to enable climate control in a vehicle cabin. Details regarding an exemplary HVAC system are described below. Compressor 170 includes a control valve 174 whose position may be varied to control the discharge capacity of the compressor. As such, compressor 170 may be an externally variable discharge compressor (EVDC). Control valve 174 may be a solenoid valve, for example, and in the embodiment shown in FIG. 1, is controlled by a control device 176 that may be operated to vary a control valve current supplied to the control valve to thereby regulate the discharge capacity of compressor 170. Control device 176 is in turn controlled by controller 12, which is depicted as sending a compressor control signal (CC) to the control device to vary the control valve current supplied to control valve 174 based on, for example, engine operating conditions and vehicle cabin climate conditions.

Turning now to FIG. 2, an exemplary HVAC system 200 in accordance with an embodiment of the present disclosure is shown. The temperature and flow of air supplied to a vehicle's cabin space may be adjusted by adjusting a ratio of hot air (generated using heating elements) and cold air (generated using cooling elements). HVAC system 200 includes a fresh air duct 202 for providing fresh air from outside the vehicle, and a recirculated air duct 204 for providing recirculated air from inside the vehicle cabin. A ratio of fresh air to recirculated air is adjusted by actuator 206 responsive to selected HVAC settings. For example, when a higher proportion of recirculated air is desired, the actuator may be positioned near the mouth of fresh air duct 202 (as shown in solid lines). Alternatively, when a higher proportion of fresh air is needed, the actuator may be positioned near the mouth of recirculated air duct 204 (as shown in dotted lines). Actuator 206 may be driven between the various positions by a vacuum motor (not shown). Alternatively, actuator 206 may be driven by an electric servo motor.

The appropriate mixture of fresh and recirculated air is then passed through HVAC cooling elements, configured to enable air-conditioning. Specifically, the air is passed through blower 208 and evaporator core 212 along conduit 210. Blower 208 includes a variable speed blower motor and a blower wheel or fan. Inside evaporator core 212, the evaporation of a low pressure cooling fluid or refrigerant 234 (for example, freon) into a low pressure gas causes a cooling effect which in turn cools the air flowing across it. Based on the temperature settings of the HVAC system, a suitable proportion of cold air 214, cooled by passage through evaporator core 212, may then be passed into ducting 222 and distributed to the cabin via vents (e.g., a front windshield vent and a rear window vent). After exiting the evaporator core, the refrigerant vapor passes through compressor 170, emerging as a hot compressed gas. The hot compressed refrigerant gas is subsequently passed through a condenser (not shown), becoming a cooled compressed liquid, after which it is fed through an expansion valve (not shown), becoming a cold liquid/vapor mixture, before finally being reintroduced into the evaporator core 212.

Similarly, hot air 220 may be generated by passage of fresh and/or recirculated air through HVAC heating elements, configured to enable air heating. Specifically, air is passed through a heater core 216. Engine coolant 218, received from the engine, is circulated through the heater core. Heater core 216 may then behave as a heat exchanger, withdrawing heat from the engine coolant and transferring the withdrawn heat to air passing across it. In this way, hot air may be generated in conduit 230 and passed into ducting 222. A climate-controlled air flow comprising a suitable amount of hot air and cold air may be generated in ducting 222, for subsequent passage to vehicle vents. Specifically, a ratio of hot air 220 to cold air 214 may be adjusted by actuator 232 responsive to selected HVAC settings. For example, when air flow of a higher temperature is requested, the actuator may be positioned near the mouth of cold air conduit 210 (as shown in dotted lines). Alternatively, when air flow of a lower temperature is requested, the actuator may be positioned near the mouth of hot air conduit 230 (as shown in solid lines). Actuator 232 may be driven by a vacuum motor or an electric servo motor (not shown). The air flow with the requested settings of flow rate and temperature may then be directed along ducting 224, 226 and/or 228 to the vehicle floor, cabin space and panels, respectively, responsive to the passenger-indicated direction of air flow.

In this way, the heating and cooling elements of HVAC system 200 may be used to deliver an air flow with an appropriate ratio of hot and cold air to a requested location, with a requested flow rate, to thereby provide the vehicle passengers with a climate-controlled air flow.

Turning now to FIG. 3, a flowchart illustrating a method 300 of controlling an AC compressor in accordance with an embodiment of the present disclosure is shown. Method 300 may be employed to control AC compressor 170 of FIG. 1, for example, and may be stored as machine-readable instructions on a suitable storage medium (e.g., ROM 106 of FIG. 1) and executed by a suitable logic subsystem (e.g., CPU 102 of FIG. 1).

At 302 of method 300, it is determined whether a reduction in the load of an engine (e.g., engine 10 of FIG. 1) is desired. The determination includes evaluating whether any of the following engine operating scenarios that would benefit from a reduction in engine load is occurring: at 304, engine startup, at 306, vehicle acceleration, at 308, brake vacuum replenishment, and at 310, stall mitigation. If it is determined that any of these scenarios is occurring (YES at any one of 304, 306, 308, and 310), method 300 proceeds to 312. If it is determined that none of these scenarios are occurring (NO at all of 304, 306, 308, and 310), method 300 ends.

At 312 of method 300, a first duration for which the AC compressor is to be operated at a minimum control valve current is determined. The torque required to drive the AC compressor may be reduced by minimizing the control valve current supplied to a control device (e.g., control device 176 of FIG. 1) controlling a control valve (e.g., control valve 174 of FIG. 1) of the compressor, in turn reducing the load on the engine, for the first duration. The first duration may be determined based on, at 314, engine operating conditions including assessment of the scenarios that were determined to occur at one or more of 304, 306, 308, and 310. For example, the first duration may be determined based on a measured or estimated duration for which the one or more scenarios persist and particularly the duration for which reduced engine load is desired according to the one or more scenarios. The first duration may be determined further based on, at 316, a desired vehicle cabin temperature. As a non-limiting example, a relatively low desired cabin temperature may limit the first duration as more immediate compressor operation may be required to meet the temperature. The desired cabin temperature may be received from one or more vehicle passengers through a suitable interface such as a control panel.

Next, at 318 of method 300, the minimum control valve current to be supplied to the control device during the first duration is determined. As with determination of the first duration at 312, the minimum control valve current may be determined based on engine operating conditions (including assessment of one or more of the scenarios occurring at 304, 306, 308, and/or 310) and/or the desired vehicle cabin temperature. In some examples, the determined minimum control valve current may be 0 A. In other examples, the determined minimum control valve current may be non-zero—for example, determination of the minimum control valve current may be based on, at 320, a current required for diagnostic checks during the first duration, which may be, for example, 0.05 A.

Next, at 322 of method 300, the control valve current is set to the minimum control valve current determined at 318 for the first duration determined at 312. Setting the control valve current to the minimum control valve current may include issuing instructions from controller 12 (FIG. 1) to control device 176, for example. By setting the control valve current to the minimum control valve current, the load imposed on the engine may be reduced as described above, in turn increasing the power that may be delivered to a drivetrain coupled to the engine.

Next, at 324 of method 300, it is determined whether the first duration has passed. If it is determined that the first duration has not passed (NO), method 300 returns to 324. If it is determined that the first duration has passed (YES), method 300 proceeds to 326. In some embodiments, the first duration may be limited if the scenario(s) prompting the reduction in control valve current cease prior to completion of the first duration.

At 326 of method 300, a sustainable control valve current is determined based on one or more performance parameters. The sustainable control valve current may be greater than the minimum control valve current but less than an operational control valve current described below. In particular, the sustainable control valve current enables the compressor to meet requirements established by the performance parameters by providing a sustainable level of performance stipulated by the performance parameters. For example, the one or more performance parameters may include, at 328, an NVH performance parameter specifying a range of control valve currents for which compressor operation produces unacceptable levels of NVH. In this example, the sustainable control valve current may be set to a value outside (e.g., above) of this range to mitigate NVH and avoid the range of currents for which NVH exceeds an acceptable limit. The one or more performance parameters may include, at 330, a compressor reliability performance parameter specifying a range of control valve currents for which compressor reliability exceeds an acceptable reliability risk. The sustainable control valve current may be set to a value outside of this range to meet the acceptable reliability risk. Finally, the one or more performance parameters may include, at 332, a required compressor torque specifying a range of control currents for which the required compressor torque is met. The sustainable control valve current may be set to a value within this range to meet the required compressor torque. The required compressor torque may be at least in part a function of the desired vehicle cabin temperature.

Next, at 334 of method 300, the minimum control valve current is stepped up to the sustainable control valve current. The control device may use a step function to perform this transition in a stepwise manner, for example. In this way, the performance parameters may be met and unacceptable compressor operating regions (with respect to NVH, reliability, etc.) avoided.

Next, at 336 of method 300, a second duration, operational current, and ramp up function are determined. The sustainable control valve current may be ramped up to the operational current, which may be relatively greater than the sustainable and minimum control valve currents, throughout the second duration according to the ramp up function. Unlike the step up from the minimum control valve current to the sustainable control valve current at 334, the ramp up to the operational control valve current is a transition that allows the control valve current to assume values between the sustainable and operational control valve currents during the second duration. The second duration, operational current, and ramp up function may be based on engine operation conditions (including assessment of the scenarios at one or more of 304, 306, 308, and 310), required compressor torque, desired vehicle cabin temperature, the one or more performance parameters evaluated at 328, 330, and 332, etc. The ramp up function may be any suitable function—e.g., a linear, polynomial, logarithmic, or an exponential function, and may be chosen to minimize torque disturbances.

Finally, at 338 of method 300, the operational current is ramped up to over the second duration according to the ramp up function. Following 338, method 300 ends.

Thus, as shown and described, method 300 may be used to reduce engine load during certain scenarios when engine and/or vehicle operation would benefit from increased available power, by reducing the torque requirements of an AC compressor driven by the engine. Reduction of AC compressor torque requirements are carried out by modifying the current supplied to a control valve of the compressor, without adversely affecting climate control afforded by the compressor and entering a region of unacceptable or undesired compressor operation (e.g., regions where unacceptable NVH levels or reliability risks are produced).

FIG. 4 shows an exemplary graph 400 of compressor operation according to method 300 of FIG. 3. In particular, graph 400 shows the control valve current (e.g., current supplied by control device 176 of FIG. 1) as a function of time for a scenario in which engine load reduction is desired and the control valve current is accordingly reduced. As shown, the control valve current is stepped down from an operational current to a minimum current beginning at a first duration $d_1$ in response to a desire/request to reduce engine load. Holding the current at the minimum current enables a reduction in the torque required to operate the compressor, in turn reducing the engine load. The minimum current may be 0 A or a substantially zero value (e.g., between 0 and 0.05 A). The minimum current is maintained throughout the first duration until its expiration (e.g., due to cessation of the reduced torque requirement). Upon expiration of the first duration, a second duration immediately initiates upon which the control current is stepped up from the minimum current to a sustainable current that enables the compressor to avoid undesirable operating ranges. The sustainable current may be 0.25 A or more, for example, or in other examples approximately 0.25 A (e.g., within 0.05 A). In this example, currents that fall within undesirable operating ranges may be between 0.05 A and 0.25 A, for example. Following this step up, the sustainable current is ramped up throughout the second duration to an operational current, which enables compressor operation according to desired vehicle cabin temperature, among other conditions. The operational current may be approximately between 0.26 A and 0.85 A, for example (e.g., within 0.05 A of either the lower or upper limit). It will be appreciated that graph 400 is provided as an example and is not intended to be limiting in any way.

FIG. 5 shows a plot 500 of operating parameters for an exemplary drive cycle of a vehicle. In particular, plot 500 includes engine RPM (e.g., for engine 10 of FIG. 1), driver requested torque, and control valve current (e.g., for control device 176 of FIG. 1), all as a function of time. As indicated at 502, a startup event occurs, bringing engine RPM to an idle level. A reduction in engine load is desired during this event, and the control valve is accordingly set to a minimum current according to method 300 of FIG. 3. The minimum current persists for a first duration until engine load reduction is no longer desired, and the minimum current is stepped up to a sustainable current and then gradually ramped up to an operational current over a second duration. As indicated at 504, driver requested acceleration occurs for which another engine load reduction is desired. Once again the control valve current is varied according to method 300, though it will be noted that the second duration throughout which the current is ramped up to the operational current is different than that employed at 502, as is the operational current relative to that employed at 502. This difference may be a result of a change in desired vehicle cabin temperature, for example. Finally, as indicated at 506, driver requested deceleration occurs for which another engine load reduction is desired, for example for the purpose of brake vacuum replenishment. Once again the control valve current is varied according to method 300, though it will be appreciated that here the sustainable current differs from that employed at 502 and 504. It will be appreciated that plot 500 is provided as an example and is not intended to be limiting in any way.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a compressor, comprising:
   regulating a discharge capacity of the compressor coupled to an engine via a control current supplied to a control device;
   holding the control current supplied to the control device at substantially zero amperes for a first duration in response to a desire to reduce a load on the engine and increase power delivered to a drive train;
   stepping the control current from substantially zero amperes to a sustainable current that provides a sustainable level of a performance parameter of the compressor, where the stepping includes avoiding current values from substantially zero to the sustainable current; and
   ramping the control current up to an operational current over a second predetermined duration from the sustainable current, where a function of the ramp up is linear, polynomial, logarithmic, or exponential.

2. The method of claim 1, wherein the operational current is approximately between 0.26 amperes and 0.85 amperes.

3. The method of claim 1, wherein the sustainable current is approximately 0.25 amperes.

4. The method of claim 1, wherein the performance parameter relates to noise, vibration, and/or reliability of the compressor.

5. The method of claim 1, wherein the performance parameter relates to torque required to drive the compressor.

6. The method of claim 1, wherein the compressor is an externally variable discharge compressor.

7. The method of claim 1, wherein the control device is a solenoid valve.

8. A system for controlling a compressor, comprising:
   a compressor;
   a control device configured to regulate a discharge capacity of the compressor via a control current supplied to the control device; and
   a controller with instructions stored thereon that when executed enable the controller to:
     hold the control current at substantially zero amperes for a first duration in response to a desire to reduce a load on an engine and increase power delivered to a drive train and then step up the control current to a sustainable current that provides a sustainable level of a performance parameter of the compressor, where the stepping includes avoiding current values from substantially zero to the sustainable current, and where the control current is ramped up to an operational current throughout a second duration from the sustainable current, where the second duration is based on required compressor torque and desired vehicle cabin temperature.

9. The system of claim 8, wherein the compressor is an externally variable discharge compressor.

10. The system of claim 8, wherein the control device is a solenoid valve.

11. A method of operating a compressor of a motor vehicle air conditioning system, comprising:
    holding a current supplied to the compressor to a minimum current in response to a request to reduce load on an engine and increase power delivered to a drive train;
    stepping up the current from the minimum current to a sustainable current in response to cessation of the request, where the stepping includes avoiding current values from substantially zero to the sustainable current; and
    increasing, via ramping, the current from the sustainable current to an operational current, the ramp up to the operational current being a transition where the current includes values between the sustainable and operational currents unlike the step up from the minimum current to the sustainable current.

12. The method of claim 11, wherein the request to reduce load on the engine results from one or more of engine startup, vehicle acceleration, brake vacuum replenishment, and stall mitigation.

13. The method of claim 11, wherein the sustainable current is outside of the current values for which operation of the compressor produces noise, vibration, and harshness above an acceptable limit, and where the current values are between the minimum current and the sustainable current and comprises values between 0.05 amperes to 0.25 amperes, and where stepping down the current from the operational current to the minimum current also avoids the current values.

14. The method of claim 11, wherein the sustainable current satisfies a performance parameter.

15. The method of claim 14, wherein the performance parameter relates to reliability of the compressor.

16. The method of claim 11, wherein the operational current enables the motor vehicle air conditioning system to meet a desired vehicle cabin temperature.

17. The method of claim 16, wherein the current supplied to the compressor is held at the minimum current throughout a first duration, and wherein the current is increased from the sustainable current to the operational current throughout a second duration, where the first duration is based on one or more of the desired vehicle cabin temperature, engine startup, vehicle acceleration, brake vacuum replenishment, and stall mitigation.

* * * * *